(12) United States Patent
Bruant et al.

(10) Patent No.: US 9,073,410 B2
(45) Date of Patent: Jul. 7, 2015

(54) MOTOR VEHICLE BODY

(71) Applicant: GM GLOBAL TECHNOLOGY OPERATIONS LLC, Detroit, MI (US)

(72) Inventors: Baptiste Bruant, Mainz (DE); Ralf Meyer, Buettelborn (DE); Simon Gross, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/136,599

(22) Filed: Dec. 20, 2013

(65) Prior Publication Data

US 2014/0175827 A1  Jun. 26, 2014

(30) Foreign Application Priority Data

Dec. 20, 2012 (DE) .......................... 10 2012 025 566

(51) Int. Cl.
*B60J 7/02* (2006.01)
(52) U.S. Cl.
CPC ....................... *B60J 7/028* (2013.01)
(58) Field of Classification Search
CPC ........................................................ B60J 7/028
USPC ...................... 296/107.2, 107.19, 146.8, 108
See application file for complete search history.

(56) References Cited

U.S. PATENT DOCUMENTS

| | | | | |
|---|---|---|---|---|
| 2,841,441 A * | 7/1958 | Evans | .............................. | 296/117 |
| 4,711,485 A * | 12/1987 | Maebayashi et al. | .......... | 296/108 |
| 5,078,447 A | 1/1992 | Klein et al. | | |
| 5,806,912 A * | 9/1998 | Ramaciotti et al. | ....... | 296/107.09 |
| 6,318,793 B1 | 11/2001 | Rapin et al. | | |
| 6,425,622 B2 * | 7/2002 | Eberle | ............................ | 296/108 |
| 6,557,921 B2 * | 5/2003 | Wezyk et al. | ............. | 296/107.07 |
| 6,957,843 B2 * | 10/2005 | Guillez | ....................... | 296/107.2 |
| 7,278,676 B2 | 10/2007 | Queveau et al. | | |
| 7,611,189 B2 * | 11/2009 | Nielander et al. | .......... | 296/146.8 |
| 7,922,233 B2 * | 4/2011 | Park et al. | ...................... | 296/108 |

FOREIGN PATENT DOCUMENTS

| | | |
|---|---|---|
| DE | 3721895 A1 | 1/1989 |
| DE | 4300677 A1 | 7/1994 |
| DE | 102011116361 A1 | 4/2013 |
| EP | 0764553 A1 | 2/1996 |

OTHER PUBLICATIONS

German Patent Office, German Patent Search Report for Application No. 102012025566.7, dated Sep. 30, 2013.

* cited by examiner

*Primary Examiner* — Pinel Romain
(74) *Attorney, Agent, or Firm* — Ingrassia Fisher & Lorenz PC (57) ABSTRACT

Above a belt line, a motor vehicle body exhibits a windshield segment, a rear segment and a roof segment that is connected with the rear segment so that it can be displaced in a displacement direction, which in a first configuration bridges an intermediate space between the windshield segment and rear segment, and in a second configuration overlaps the rear segment. The roof segment can be swiveled out of the first configuration around a roof segment axis into an intermediate position, in which a rear edge of the roof segment extends under a front edge of the rear segment without any overlap in the displacement direction.

18 Claims, 5 Drawing Sheets

MOTOR VEHICLE BODY

CROSS-REFERENCE TO RELATED APPLICATION

This application claims priority to German Patent Application No. 10 2012 025 566.7, filed Dec. 20, 2012, which is incorporated herein by reference in its entirety.

TECHNICAL FIELD

The technical field relates to a motor vehicle body, which can be switched between different body styles.

BACKGROUND

Known from DE 43 00 677 A1 is a motor vehicle body that can be designed like a coupe, targa or roadster, depending on what the user wants. Above its belt line, this body exhibits a windshield segment, a rear segment and a roof segment displaceably connected with the rear segment. In the coupe configuration, the roof bridges the passenger compartment, covering an intermediate space between the windshield segment and rear segment; in the targa design, it is retracted toward the back, on the rear segment. The roof segment movement is guided with the help of lateral carriers, which can telescope in and out of channels in the rear segment, and are connected with the roof segment by swiveling levers.

Swiveling the levers lifts the roof segment over its entire expansion out of the coupe position over the rear segment, so that it then can slide toward the back over the rear segment. To enable this movement, the lateral channels of the rear segment that guide the lateral carriers and levers must be outwardly and upwardly open. This makes it difficult to provide a seal against rainwater. The roof segment lying on the rear segment in the targa configuration forms what can clearly be discerned as a foreign element that detracts from the appearance of the body.

In order to achieve the roadster configuration, the rear segment along with the C-pillars supported against the flanks of the body must be displaced toward the back and downwardly swiveled, which significantly detracts from the space available for other purposes in the tail end of the vehicle. In addition, the necessity of being able to recess the C-pillars into the body makes it difficult to give them the load carrying capacity needed to ensure an effective rollover protection.

In view of the foregoing, at least one object is to create a switchable motor vehicle body that avoids one or more of the above disadvantages of prior art. In addition, other objects, desirable features and characteristics will become apparent from the subsequent summary and detailed description, and the appended claims, taken in conjunction with the accompanying drawings and this background.

SUMMARY

In a motor vehicle body that, above a belt line, exhibits a windshield segment, a Rear segment, and a roof segment that is connected with the rear segment so that it can be displaced in a displacement direction, which in a first configuration bridges an intermediate space between the windshield segment and rear segment, and in a second configuration overlaps the rear segment, the object is achieved by virtue of the fact that the roof segment can be swiveled out of the first configuration around a roof segment axis into an intermediate position, in which a rear edge of the roof segment extends under a front edge of the rear segment without any overlap in the displacement direction. This makes it possible to conceal the roof segment under the rear segment in a targa and/or roadster configuration, giving the motor vehicle an attractive appearance even in these configurations, and especially the targa configuration. Since connecting elements that secure the roof segment with the rear segment do not have to protrude from the rear segment into the open in the targa configuration, the rear segment also requires no outwardly open channel that makes it harder to form a seal against rainwater.

When in the intermediate position, if the entire roof segment extends under a surface that lengthens the front edge of the rear segment in the displacement direction, it can be moved along a straight line under the rear segment without being further swiveled. While being swiveled into the intermediate position, the rear edge of the roof segment moves downward. By contrast, parts of the roof segment lying in front of the roof segment axis relative to the longitudinal direction of the vehicle move upward, so that the process of swiveling into the intermediate position and then moving the roof segment under the rear segment does not detract from the headroom in a front area of the passenger compartment. Therefore, the roof segment axis preferably lies as far to the back of the body as possible; in particular, it should extend behind a central plane of the roof segment and/or behind a driver's seat in relation to the longitudinal direction of the body.

To be able to economize on space when accommodating the roof segment, the orientation selected for the roof segment in the intermediate position is preferably such that the dimension of the roof segment measured in a sectional plane perpendicular to the roof segment axis assumes a minimum value transverse to the displacement direction in the intermediate position. The displacement direction can be determined by at least one rail of the rear segment, in which the roof segment is guided when moving from the intermediate position into the position concealed under the rear segment. In order to guide the movement of the roof segment, it is best that the rail carry a slide, and the roof segment is joined with the slide by two arms hinged to the slide and roof segment.

A motor can be coupled to one of the arms for driving the swiveling movement of the roof segment. The motor can be coupled to the arm by a connecting rod body, which is displaceably or swivelably guided on the slide, and interacts with a connecting rod projection of the arm. A motor can also be provided for moving the roof segment in the displacement direction. This is preferably the same motor also used for swiveling the roof segment. Such a motor can be coupled to the slide and/or control rod by way of a cable pull or rotatable threaded rod.

In order to be able to use the same motor to swivel the roof segment and effect displacement, apparatus are preferably on hand to block a displacement by the slide in a displacement direction if the orientation of the roof segment deviates from that of the intermediate position. Accordingly, apparatus can be provided to block a swiveling motion by the roof segment if the position of the roof segment deviates from the intermediate position in the displacement direction.

The rear segment can preferably be switched from the second, or targa, configuration into a recessed third configuration, hereinafter referred to as the roadster configuration. It is best that the rear segment consist of several parts, with two C-pillars and a central piece flanked by the C-pillars in the first and second configuration. For conversion into the third configuration, the C-pillars can preferably be swiveled around an axis that extends essentially in the longitudinal direction of the vehicle, i.e., is oriented more closely to the longitudinal than transverse direction of the vehicle. This makes it possible to support the base of the C-pillars directly in the body in the first and second configurations, and thereby impart to them the load carrying capacity required for effective rollover protection.

The central piece is secured to a lower section of the body, preferably by way of a multiple-joint hinge. The multiple-joint hinge makes it possible to recess the central piece over its entire expansion. This makes it easier to swivel the C-pillars on the recessed central piece in the third configuration, even if the C-pillars extend over the entire length of the central piece.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
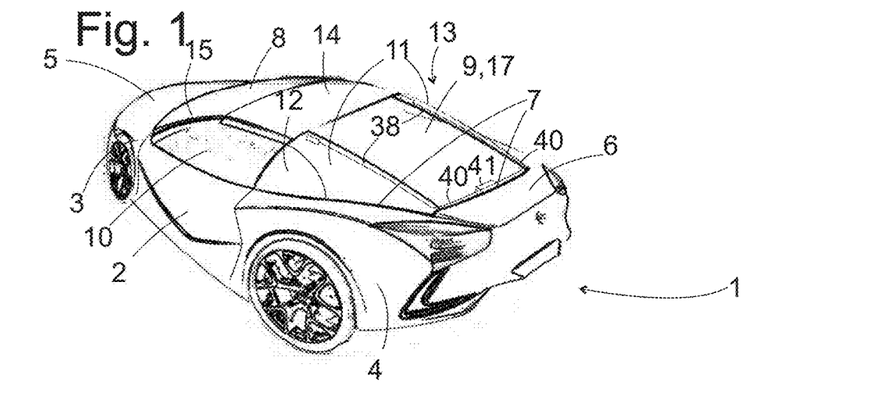
FIG. 1 is a perspective view depicting a motor vehicle according to an embodiment in a coupe configuration.

FIG. 1 is an oblique, perspective view of a four-seat sports car according to the present invention from behind. A base body 1 of the vehicle body encompasses an engine hood 5, a tailgate 6, as well as a door 2 on either side of the body and rear fenders 3, 4. A belt line 7 of the body is defined by the rear edge of the engine hood 5, the front edge of the tailgate 6, as well as the upper edges of the doors 2 and fenders 4. A body superstructure above the belt line 7 encompasses a front segment comprised of a windshield 8 laterally encased by A-pillars 15 and a rear segment 13 with two C-pillars 11 that flank a central piece 17, which is essentially formed by a rear window 9 and a frame here concealed under the rear window 9. The intermediate space between the A- and C-pillars 15, 11 is filled at each flank of the vehicle by a front side window 10 that can be recessed in the door 2 and a rear side window 12 that can be recessed in the rear fender 4. A B-pillar could be provided between the side windows 10, 12; it is absent in the configuration shown here.

Figure 2:
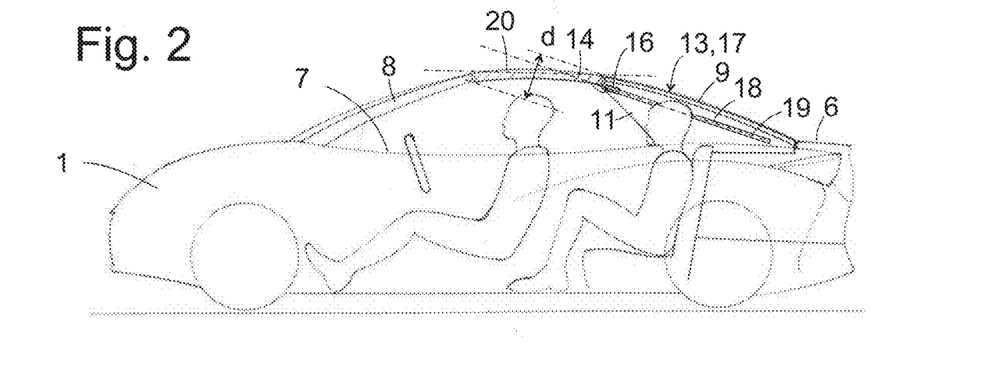
FIG. 2 is a schematic longitudinal section through the vehicle on FIG. 1.

A roof segment 14 extends between a front edge of the rear segment 13, above the back seats of the vehicle, and a rear edge of the rear window 9. The front edge of the roof segment 14 is detachably and positively latched to the windshield 8; a rear edge of the roof segment 14 is joined by articulated brackets with two slides 16, which as shown on FIG. 2 are accommodated in two rails 18 secured to the central piece 17, in particular to longitudinal profiles of the frame enveloping the rear window 9, and can move along the rails 18. The rails 18 slope toward the tail end of the vehicle, while the front and rear edges of the roof segment 14 lie at about the same height. Therefore, the displacement direction defined by the rails 18, denoted on FIG. 2 by a dot-dashed line 19, and a line 20 running through the front and rear edges of the roof segment 20 generate a certain angle, and the dimension d of the roof segment 14 as measured transverse to the displacement direction of the rails 18 is significantly greater than the dimension measured transverse to the line 20. As long as the roof segment 14 is oriented as depicted on FIG. 2, the roof segment 14 cannot be displaced toward the back, since the front edge of the rear segment 13 blocks the path.

Figure 3:
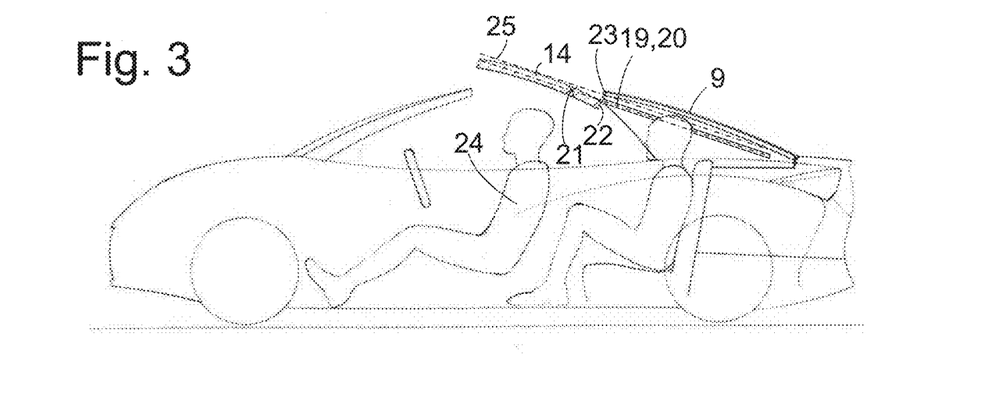
FIG. 3 is a longitudinal section similar to FIG. 2, in which a roof segment of the vehicle is in an intermediate position.

FIG. 3 presents a longitudinal section through the vehicle similar to FIG. 2, in which the roof segment 14 is swiveled around a virtual axis, hereinafter referred to as the roof segment axis 21, in such a way that the line 20 running through the front and rear edge of the roof segment 14 is parallel to the displacement direction 19 of the rails 18. In this orientation, the dimension d of the roof segment 14 measured transverse to the displacement direction is minimal, and the rear edge 22 of the roof segment 14 is recessed under the front edge 23 of the rear segment 13 and C-pillars 11, clearing the path for a rearward displacement of the roof segment 14 along the rails 18. Since the roof segment axis 21 in the vehicle extends behind a sitting position of the vehicle 24, here in a rear third of the roof segment 14, swiveling the roof segment 14 into the intermediate position on FIG. 3 does not restrict the headroom for the driver 24. A line parallel to the displacement direction 19 and running through the front edge 23 of the rear segment 13 is marked 25 on FIG. 3. In the intermediate position, the roof segment 14 is situated completely under the line 25, so that it can be displaced under the rear segment 13 along a straight path and without any more swiveling.

Figure 4:
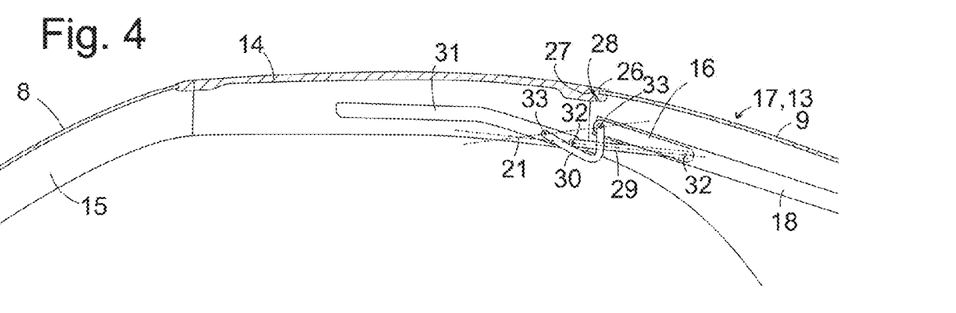
FIG. 4 is a magnified section through the roof of the vehicle in a coupe configuration.

FIG. 4 presents a magnified section of the roof segment 14 and adjacent parts of the front and rear segments of the vehicle body in a coupe configuration. A front edge of the rear window 9 is encased in a profile 26 of the frame already mentioned above, which in conjunction with the rear window 9 forms the central piece 17 of the rear segment 13. A sealing profile 27 is elastically compressed in a gap between the profile 26 and roof segment 14 bordering thereon, so that rainwater running off from the roof segment 14 toward the back is laterally diverted in a groove 28 between the roof segment 14 and profile 26 sealed at the bottom by the sealing profile 27.

The slide 16 is in a stop position at the front end of the rails 18. Two arms 29, 30 are each joined by hinges 32, 33 with the slide 16, as well as with a profile 31 secured to a lateral edge of the roof segment 14 above the side windows 10, 12. The point of intersection between two lines, one of which extends through the hinges 32 of the arm 29 and the other through the hinges 33 of the arm 30, defines the roof segment axis 21 around which the roof segment 14 swivels if the arms 29, 30 rotate.

Figure 5:
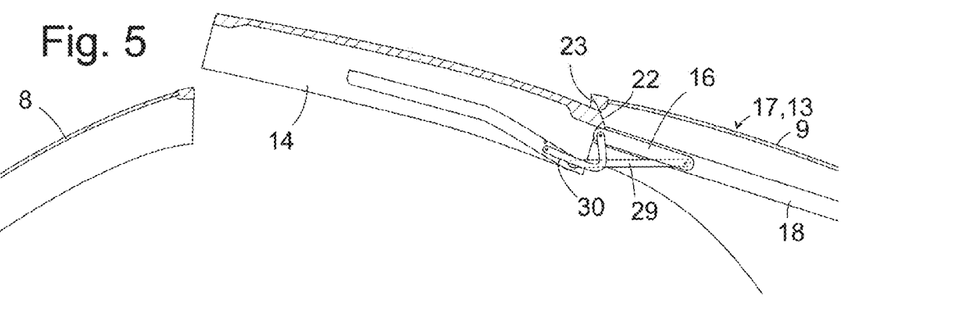
FIG. 5 is a section similar to FIG. 4 in the intermediate position.

FIG. 5 shows the roof segment 14 after it has been swiveled into the intermediate position. The edges 22, 23 of the rear and roof segment no longer overlap each other, and the roof segment 14 is oriented essentially parallel to the rail 18. In this position, the slide 16 and roof segment 14 can be moved toward the back along the rail 18, wherein the roof segment 14 comes to rest at a slight distance under the rear window 9.

Figure 6:
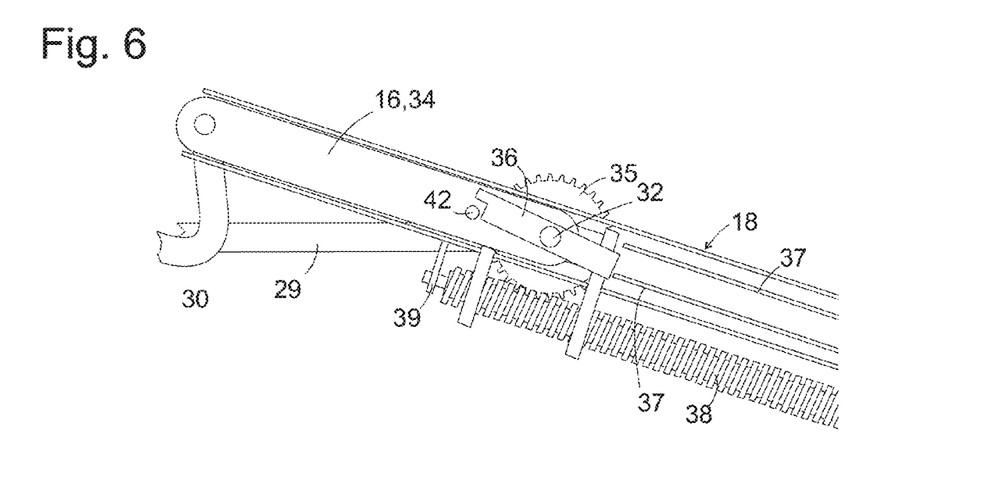
FIG. 6 is a magnified view of a slide that guides the movement of the roof segment.

FIG. 6 shows one of the two slides 16 in a magnified side view. An elongated base body 34 of the slide 16 is positively held in the rail 18. The arm 29 is connected in a torque-proof manner with a toothed wheel 35 and an elongated retaining element 36 by means of a shaft of its hinge 32 engaging the base body 34. In the configuration shown on FIG. 6, which corresponds to the closed position of the roof segment 14 depicted on FIGS. 1 and 2, one end of the retaining element 36 lies directly opposite a guiding rib 37 of the rail 18, and thereby blocks a displacement of the slide 16 in the rail 18 in the direction of the tail end of the vehicle.

The toothed wheel 35 engages a threaded rod 38. The ends of the threaded rod 38 can turn in supports 39 fixed on the rail 18, but are held immovably in translation. The only visible support 39 on FIG. 6 is the one engaging the front end of the threaded rod 38; at the height of the rear support, the threaded rod 38 is joined by a flexible shaft 40 with an electric motor 41, which, as evident from FIG. 1, is situated under the rear segment 13, and coupled to both slides 16 by shafts 40 outgoing in opposite directions. By turning the threaded rods 38 on both sides of the central piece 17, the motor 41 drives a rotation of the retaining elements 36 and arms 29. A rotation by the arms 29 is blocked as long as the motor 41 is not running.

The configuration of the slide 16 depicted on FIG. 6 corresponds to the closed position of the roof segment 14 shown on FIGS. 1 and 2. In this position, the toothed wheel 35 cannot rotate clockwise, since a continued upward movement of the rear edge 22 of the roof segment 14 is precluded by its contact with the rear segment 13. By contrast, turning the toothed wheel 35 counterclockwise causes the arms 29, 30 to downwardly swivel, and the roof segment 14 nears the intermediate position shown on FIG. 3. Once the intermediate position has been reached, contact between the retaining element 36 and a stop pin 42 protruding from the base body 34 blocks any further rotation by the toothed wheel 35 and arms 29, 30. In this stop position, the retaining element 36 is parallel to the two guiding ribs 37, and its end that previously abutted against the end of one of the guiding ribs 37 fits between the guiding ribs 37. The tensile force exerted on the toothed wheel 35 by the continued rotation of the threaded rod 38 now sets the slide 16 as a whole in motion along the rail 18 toward the tail end of the vehicle. Once the retaining element 36 has resultantly become inserted between the guiding ribs 37, another swiveling motion by the roof segment 14 is precluded. As a result, continuously rotating the threaded rod 38 initially causes a swiveling of the roof segment 14 from the closed position on FIGS. 1 and 2 into the intermediate position on FIG. 3, followed by a displacement of the roof segment 14 along the rail 18.

Figure 7:
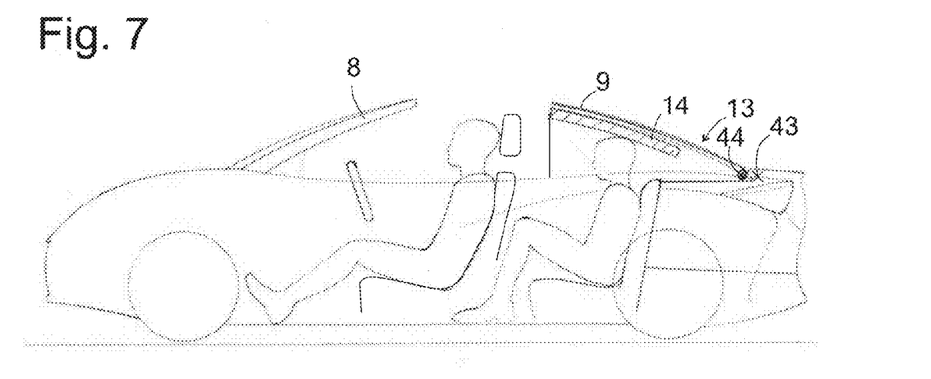
FIG. 7 is a longitudinal section similar to FIG. 2 through the vehicle in a targa configuration.

In this way, the roof segment 14 finally reaches a stop position, in which, as shown on FIG. 7, it is essentially completely concealed under the rear segment 13, and essentially extends parallel to the rear window 9 and at a slight distance from the latter, economizing on space. This is the targa configuration. Since the central piece 17 and C-pillars 11 taken together are wider than the roof segment 14, the roof segment 14 has room inside the body, and no outwardly open grooves are required through which the arms that carry the roof segment outside of the body would have to extend.

When operating the motor 41 in the opposite rotational direction, the slides 16 are initially pushed toward the top and front in the rails 18. The retaining elements 36 engage between the guiding ribs 37, preventing the toothed wheels 35 from turning. After they have again reached the stop position depicted on FIG. 5 at the front end of the rails, the blockade placed on the retaining elements 36 by the guiding ribs 37 is lifted, and the roof segment 14 swivels until the coupe configuration is reached once more.

Figures 8, 9:
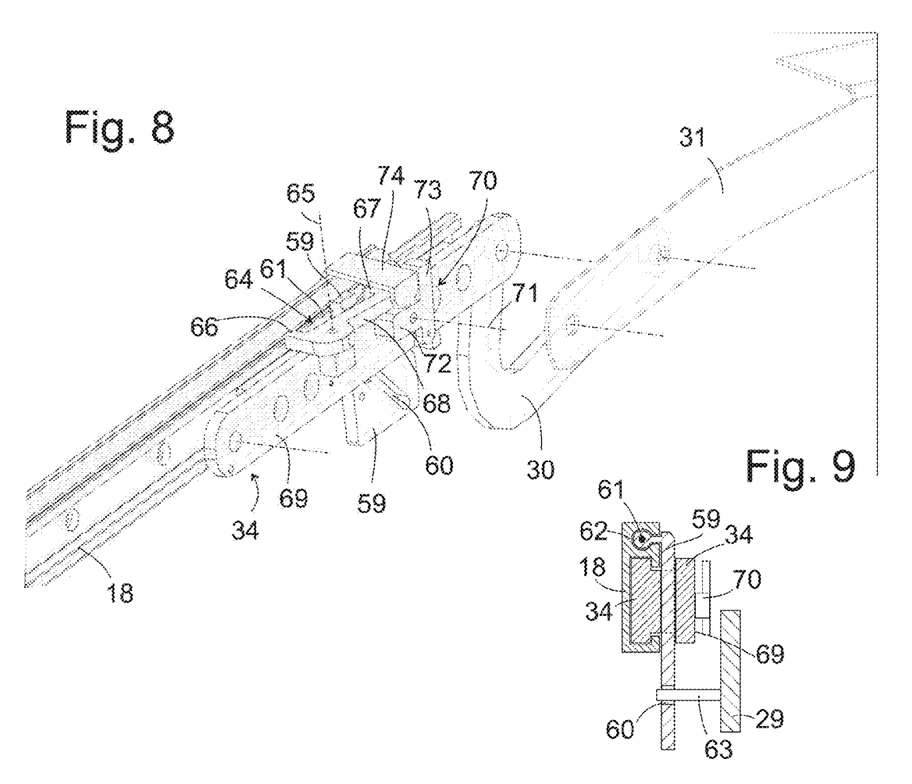
FIG. 8 is a magnified view of the slide according to a second embodiment, with the roof segment held in a coupe configuration.
FIG. 9 is a section through the slide on FIG. 8.

FIG. 8 and FIG. 9 show perspective views of a slide 16 according to a second embodiment of the invention, the former with a roof segment held in a closed position, and the latter with the roof segment held in the intermediate position. Components in this embodiment that already correspond to those described in reference to FIG. 1 to FIG. 7 are labeled with the same reference numbers, and will not be explained again. FIG. 8 and FIG. 9 do not depict the roof segment 14 itself, but rather only a respective portion of the profile 31 secured to the roof segment 14. As also shown on FIG. 4 and FIG. 5, a base body 34 of the slide 16 and the profile 31 are hinged together by two arms 29, 30. The arm 29 is omitted on FIG. 8, so as to more clearly depict a connecting rod body 59, which otherwise would be for the most part concealed by the arm 29 in the perspective of this figure.

FIG. 9 shows the slide 16 in a section perpendicular to the longitudinal direction of the rail 18. The connecting rod body 59 is displaceably held in a gap in the base body 34 in the longitudinal direction of the rail 18, and encompasses a plate that downwardly projects out of the gap, and incorporates a connecting rod 60 oriented at an inclination to the longitudinal direction, and a connecting section, which engages into a channel 62 of the rail 18 open at the edge, and there is secured to a cable 61 of a cable pull. The cable 61 extends over a deflection roller at the lower end of the rail to a motor 41, which effects the displacement of the slide 16 and is situated at the lower edge of the central piece 17, as depicted on FIG. 1. A latch 64 is mounted on an upper narrow edge of the base body 34 so that it can swivel around an axis 65 perpendicular to this narrow edge. The latch has projections 66, 67 on a side facing the rail 18, and a rear flank 68 facing away from the rail.

A sliding bolt 70 is mounted so that it abuts against a main surface 69 of the base body 34, and can swivel around an axis 71. In the configuration on FIG. 8, the swiveling motion of the sliding bolt 70 is blocked by having a leg 72 of the sliding bolt 70 abut against a part of the latch 64 that projects over the main surface 69. A second leg 73 of the sliding bolt 70 abuts against a U-shaped strap 74 secured to the rail 18.

The connecting rod 60 accommodates a (here pin-shaped) connecting rod projection 63 of the arm 29. In the configuration on FIG. 8, this connecting rod projection 63 is in a stop position against an upper rear end of the connecting rod 60. With the motor 41 in operation, contact between the leg 73 and strap 74 prevents a rearward movement by the slide 16 along the rail 18. For this reason, only the connecting rod body 59 can follow the pull of the cable 61. While the connecting rod body 59 moves relative to the base body 34, the connecting rod projection 63 in the connecting rod wanders downward, and the front end of the arm 29 acting on the profile 31 swivels toward the bottom.

Once the connecting rod body 59 has passed the front projection 67 of the latch 64, the latch 64 swivels around the axis 65, so that its projections 66, 67 on the rear side and front (facing away from the viewer on FIGS. 8 and 10) side of the connecting rod body 59 engage each other. The swiveling motion causes the rear flank 68 of the latch 64 to become flush with the main surface 69, and stop blocking the sliding bolt 70. By that time, the connecting rod projection 63 has reached the front lower end of the connecting rod 60, and swiveled the roof segment 14 into the intermediate position.

Figure 10:
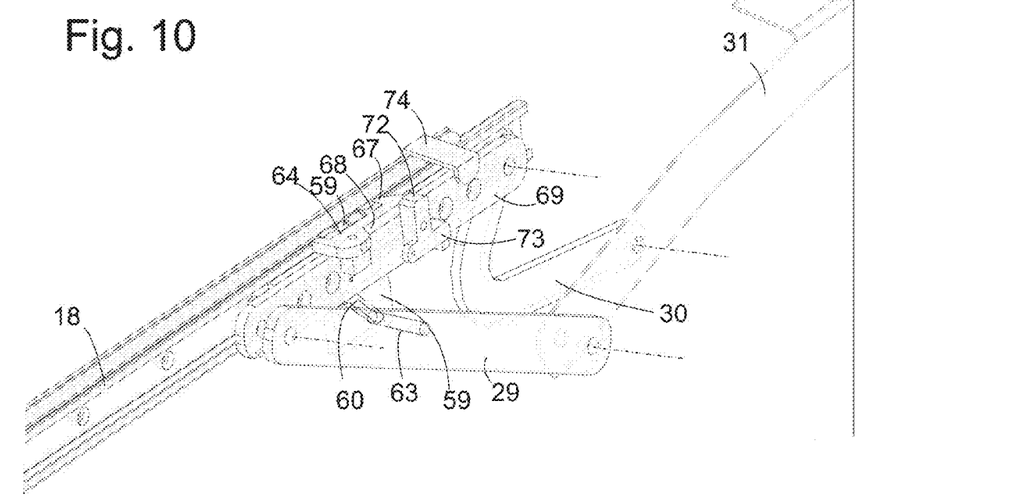
FIG. 10 is a view similar to FIG. 8 with the roof segment held in an intermediate position.

If the cable 61 continues to exert a rearward tensile force on the slide 16, the latter starts moving as a whole toward the back, wherein the sliding bolt 70 in contact with the strap 74 tilts around the axis 71 into the orientation depicted on FIG. 10. The leg 72 now rising up over the upper narrow side of the base body 34 blocks the projections 66, 67 of the latch 64 on the front and rear sides of the connecting rod body 59, and thereby prevents a displacement by the connecting rod body 59 relative to the base body 34. As a result, the arm 29 cannot swivel against the base body, and the roof segment 14 forms a rigid unit with the slides 16 acting on its two sides. While retaining the orientation of the roof segment 14, the latter can be displaced along the rails 18 up to a stop position at the lower, rear end of the rails 18, in which the targa configuration on FIG. 7 is reached.

If the direction of the force exerted by the cable 61 on the slide 16 is reversed in the configuration shown on FIG. 10, the slide 16 wanders toward the top and front along the rail, until it has reached the stop position at the front end of the rail. By then, the sliding bolt 71 has passed the strap 74 in the opposite direction, the leg is again folded into the position adjoining the main surface 69 on FIG. 8, and the projection 67 laterally evades the connecting rod body 59. This unlocks the connecting rod body 59 on the base body 34, and when the connecting rod body 59 wanders toward the front along the base body, the arm 29 swivels the roof segment 14 back into the closed position on FIG. 1 or FIG. 2.

Figure 11:
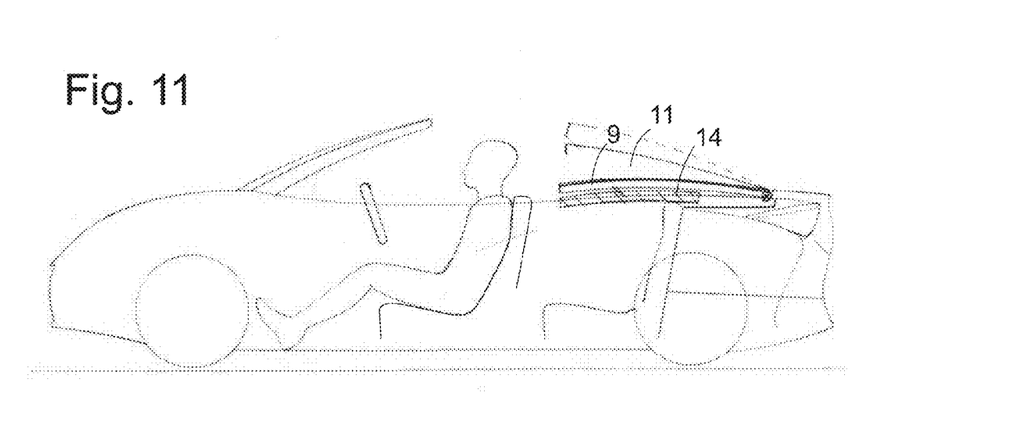
FIG. 11 is a section similar to FIG. 2 through the vehicle in a roadster configuration.
Figure 12:
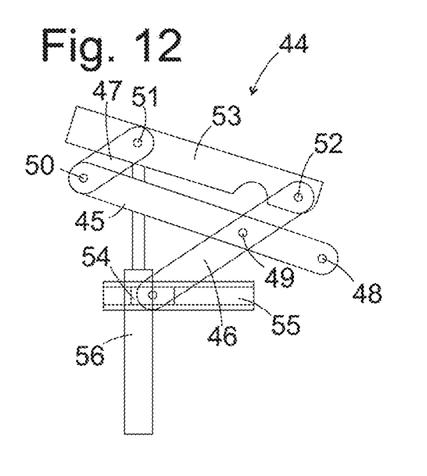
FIG. 12 is a hinge of the rear segment of the vehicle in a coupe or targa configuration.
Figure 13:
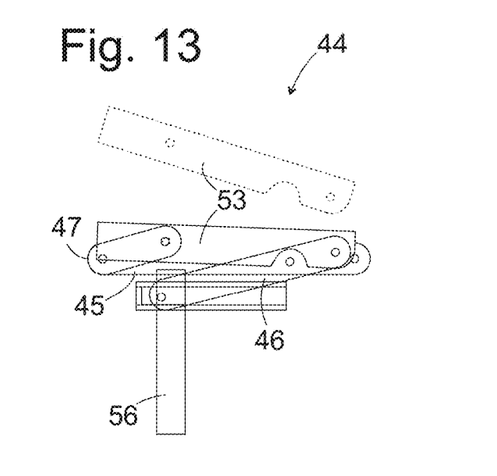
FIG. 13 is the hinge on FIG. 12 in a roadster configuration.

In order to switch from the targa configuration on FIG. 7 into the roadster configuration on FIG. 11, the rear segment central piece 17 is downwardly swiveled around an axis 43 adjacent to the tailgate 6 and extending in the transverse direction of the vehicle, and the side windows 12 are retracted into the fenders 4. A hinge 44 with the design schematically depicted on FIGS. 12 and 13 is preferably used for recessing the central piece 17. This hinge 44 encompasses three articulated brackets 45, 46, 47. The articulated bracket 45 is connected at its rear, lower end with the base body 1 of the body (not shown on FIG. 12 and FIG. 13) by a joint 48, and joined by additional joints 51, 52 to articulated brackets 46, 47. In turn, joints 51, 52 cause the latter to engage a profile 53 that forms part of the frame of the rear segment central piece 17.

The joints 49 to 52 make up the corners of a parallelogram. The articulated bracket 46 is further hinged to a slide 54, which is accommodated in a horizontal rail 55 fixed to the base body 1 so that it can be displaced in the longitudinal direction of the vehicle. A gas spring 56 is joined with the base body 1 on the one hand, and with the profile 53 on the other, so as to exert an upwardly directed force that drives the central piece 17 into the elevated position on FIG. 2, 3, 7. The gas spring 56 can also be replaced by a linear actuator for driving a displacement motion by the central piece 17 between the elevated position on FIG. 2, FIG. 3, FIG. 7 and the recessed position on FIG. 11.

Figure 14:
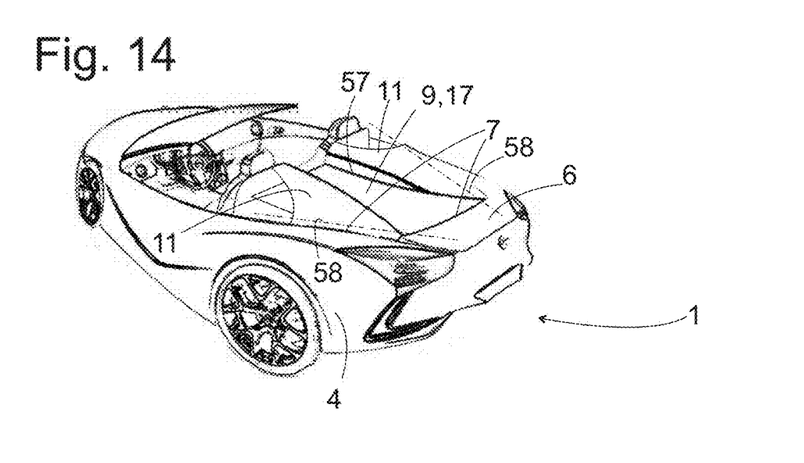
FIG. 14 is a view similar to FIG. 1 of the vehicle in a roadster configuration.

FIG. 13 shows the hinge 44 in a configuration that corresponds to the recessed position of the central piece 17. The location of the profile 53 corresponding to the elevated position is denoted with a dashed line, and as evident, the hinge 44 makes it possible to recess the central piece 13 over its entire length by defining a virtual swiveling axis 43 lying behind a rear edge of the central piece 17 at the height of the tailgate 6. This recessing provides the required space that the C-pillars 11 need to subsequently be swiveled around an axis 58 into a position shown on FIG. 14, in which inner edges 57 of the C-pillars 11 that had been situated directly opposite the side edges of the central piece 17 with the latter in the elevated position now contact the central piece 17 from above. The axes 58 run adjacent to the belt line 7 at the height of the fenders 7, i.e., adjacent to the upper edges of the fenders 4 bordering the C-pillars 11. The axes 58 extend essentially in the longitudinal direction of the vehicle, but here not precisely, rather intersecting each other behind the rear of the vehicle at an acute angle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle body that above a belt line comprises:
   a windshield segment;
   a rear segment; and
   a roof segment that is connected with the rear segment and displaceable in a displacement direction,
   wherein the roof segment in a first configuration bridges an intermediate space between the windshield segment and rear segment,
   wherein the roof segment in a second configuration overlaps the rear segment, and
   wherein the roof segment is configured to swivel out of the first configuration around a roof segment axis into an intermediate position, in which a rear edge of the roof segment extends under a front edge of the rear segment without any overlap in the displacement direction, and wherein the roof segment axis is located in front of the rear edge and behind a front edge of the roof segment.

2. The motor vehicle body according to claim 1, wherein the entire roof segment in the intermediate position extends under a line that lengthens the front edge of the rear segment in the displacement direction.

3. The motor vehicle body according to claim 1, wherein the roof segment axis extends behind a central plane of the roof segment in relation to the longitudinal direction of the body.

4. The motor vehicle body according to claim 1, wherein the dimension of the roof segment measured in a sectional plane perpendicular to the roof segment axis assumes a minimum value transverse to the displacement direction in the intermediate position.

5. The motor vehicle body according to claim 1, wherein the rear segment comprises a rail in which the roof segment is guided in the displacement direction.

6. The motor vehicle body according to claim 5, wherein the rail carries a slide and two arms are hinged to the slide and roof segment.

7. The motor vehicle body according to claim 6, further comprising a motor that is coupled to one of the arms for swiveling the roof segment.

8. The motor vehicle body according to claim 7, wherein the motor is coupled to the arm by a connecting rod body that is guided on the slide and interacts with a connecting rod projection of the arm.

9. The motor vehicle body according to claim 1, further comprising a motor that is configured to move the roof segment in the displacement direction.

10. The motor vehicle body according to claim 7, wherein the motor is coupled to the slide swiveling the roof segment with a cable pull.

11. The motor vehicle body according to claim 10, further comprising an apparatus to block a displacement by the slide in a displacement direction if the orientation of the roof segment deviates from that of the intermediate position.

12. The motor vehicle body according to claim 1, wherein the rear segment is switchable from the second configuration into a recessed third configuration.

13. The motor vehicle body according to claim 12, wherein the rear segment encompasses two C-pillars and a central piece flanked by the C-pillars in the first configuration and the second configuration, and that the C-pillars are switchable into the third configuration by a swivel action around an axis that essentially runs in the longitudinal direction of the vehicle.

14. The motor vehicle body according to claim 13, wherein the central piece is secured to a base body of the body by way of a multiple joint hinge.

15. The motor vehicle body according to claim 13, wherein the C-pillars lie on the central piece in the third configuration.

16. The motor vehicle body according to claim 1, wherein the roof segment axis extends behind a driver's seat in relation to the longitudinal direction of the body.

17. The motor vehicle body according to claim 7, wherein the motor is coupled to the arm swiveling the roof segment with a rotatable threaded rod.

18. The motor vehicle body according to claim 10, further comprising an apparatus to block a swiveling motion by the roof segment if the position of the roof segment deviates from the intermediate position in the displacement direction.

* * * * *